United States Patent [19]

Smeester

[11] Patent Number: 5,740,757
[45] Date of Patent: Apr. 21, 1998

[54] METHOD AND APPARATUS FOR FEEDING ANIMALS IN A HERD

[75] Inventor: William T. Smeester, Iron Mountain, Mich.

[73] Assignee: Jitco Industries, Inc., Iron Mountain, Mich.

[21] Appl. No.: 704,695

[22] PCT Filed: Jan. 17, 1996

[86] PCT No.: PCT/US96/00761

§ 371 Date: Nov. 5, 1996

§ 102(e) Date: Nov. 5, 1996

[87] PCT Pub. No.: WO96/22018

PCT Pub. Date: Jul. 25, 1996

[51] Int. Cl.$^6$ .............................. A01K 5/02; A01K 13/00
[52] U.S. Cl. ..................... 119/51.02; 119/57.4; 119/665; 119/792
[58] Field of Search .................. 119/51.02, 56.1, 119/56.2, 57.1, 57.4, 57.92, 604, 665, 666

[56] References Cited

U.S. PATENT DOCUMENTS

| | | |
|---|---|---|
| 3,116,716 | 1/1964 | Sime . |
| 3,557,757 | 1/1971 | Brooks . |
| 3,870,023 | 3/1975 | Wilson . |
| 3,900,005 | 8/1975 | Goldsmith . |
| 3,934,607 | 1/1976 | Revesz . |
| 3,943,888 | 3/1976 | Nordegren et al. . |
| 3,999,517 | 12/1976 | Andersson . |
| 4,011,838 | 3/1977 | Nordegren et al. . |
| 4,021,166 | 5/1977 | Glanvall et al. . |
| 4,023,588 | 5/1977 | Olander . |
| 4,033,295 | 7/1977 | Soderlund . |
| 4,046,208 | 9/1977 | Stenstrom . |
| 4,079,832 | 3/1978 | Gallei . |
| 4,080,995 | 3/1978 | Olander . |
| 4,126,103 | 11/1978 | Olander . |
| 4,162,683 | 7/1979 | Brooks . |
| 4,174,721 | 11/1979 | Wuchse . |
| 4,196,696 | 4/1980 | Olander . |
| 4,214,552 | 7/1980 | Olander . |
| 4,214,553 | 7/1980 | Olander . |
| 4,231,323 | 11/1980 | Olander . |
| 4,253,419 | 3/1981 | Yang . |
| 4,322,021 | 3/1982 | Olsson . |
| 4,331,102 | 5/1982 | Olander . |
| 4,334,502 | 6/1982 | Cox . |
| 4,463,706 | 8/1984 | Meister et al. . |

(List continued on next page.)

FOREIGN PATENT DOCUMENTS 8001231  6/1980  WIPO .

OTHER PUBLICATIONS

Alfa-Laval Agri, Inc. Farmtronix Brochure No. SA-2266 entitled "Computer Feeding" copyrighted in 1987.
Alfa-Laval Agri, Inc. Brochure No. SA 2226 entitled "The De Laval Feed Car." dated Dec. 1985.

*Primary Examiner*—Todd E. Manahan
*Attorney, Agent, or Firm*—Hovey, Williams, Timmons & Collins

[57] ABSTRACT

A feeder (10) for bison and other herd-type animals, particularly those difficult to domesticate, includes a feed storage unit (16) having a feed compartment (72) for holding animal feed, a frame (12) for carrying the storage unit (16), a feed dispensing unit (18) for delivering feed from the compartment (72), a controller unit (14) for identifying the animal to be fed, and actuating the dispensing unit (18) to deliver a ration of animal feed in response to the identification signal received. The feeder (10) preferably includes a plurality of dispensing units (18) for feeding several animals at different sites (48, 50, 52). Legs (102) located between the feeding sites (48, 50, 52) separate the animals during feeding, and visual barriers (106) inhibit the feeding animals from seeing one another. Preferably, only portions of the feed are intermittently delivered by the dispensing unit (18) so that dominant animals are inhibited from appropriating the share of lesser animals in the herd.

43 Claims, 6 Drawing Sheets

U.S. PATENT DOCUMENTS

| | | |
|---|---|---|
| 4,485,762 | 12/1984 | Sutton et al. . |
| 4,516,592 | 5/1985 | Schultz et al. . |
| 4,517,923 | 5/1985 | Palmer . |
| 4,532,892 | 8/1985 | Kuzara . |
| 4,572,105 | 2/1986 | Chowdhury et al. . |
| 4,580,529 | 4/1986 | Wilson . |
| 4,582,021 | 4/1986 | Herr . |
| 4,672,917 | 6/1987 | Fox . |
| 4,684,330 | 8/1987 | Andersson et al. . |
| 4,712,511 | 12/1987 | Zamzow et al. . |
| 4,807,566 | 2/1989 | Chowdhury . |
| 4,838,203 | 6/1989 | Ellis et al. . |
| 4,993,365 | 2/1991 | Weerstra . |
| 5,056,467 | 10/1991 | Schaefer . |
| 5,069,165 | 12/1991 | Rousseau . |
| 5,088,447 | 2/1992 | Spencer et al. . |
| 5,195,455 | 3/1993 | van der Lely et al. . |
| 5,241,924 | 9/1993 | Lundin et al. . |
| 5,259,337 | 11/1993 | Rasmussen . |
| 5,309,864 | 5/1994 | Harmsen et al. . |

METHOD AND APPARATUS FOR FEEDING ANIMALS IN A HERD

BACKGROUND OF THE INVENTION

1. Field of the Invention

This application concerns an apparatus for providing improved care for bison, and more particularly concerns an apparatus which can provide a predetermined ration of feed to animals, and more particularly bison in a herd. The apparatus also provides for medicating the bison during feeding, and a method of medicating animals during feeding by electronically identifying them and responsively delivering a quantity of medication. Finally, the method and apparatus hereof provide a convenient and efficient means of applying an insect repellant, such as a fly spray, to bison during feeding.

2. Description of the Prior Art

Bison, often called the American Buffalo, are animals which were on the brink of extinction due to overhunting and have been repopulated to a point where they can again be harvested. The bison is a very desirable animal to raise for meat production because of the lean character of its meat and its hardiness on the open range. For this these reasons, as well as the fact that bison meat commands premium prices, ranchers in many parts of the United States and Canada have found that bison are a preferred range animal to domestic cattle.

In many ways, raising bison has proven to be a difficult proposition because of fundamental differences from domestic livestock. Bison retain their wildness, making them avoid humans and resistant to capture. They are extremely difficult to catch for normal veterinary treatment and will often injure their handlers. They do not do well in enclosures and instead seem to thrive on the range. However, ranchers seeking to maximize growth, breeding capacity and success, and maintain healthy herds often attempt to supplement the typical forage of ranch-raised bison by feeding range blocks for additional nutrition.

While this type of feeding produces some favorable results, it also presents noticeable problems. Bison herds include dominant animals which claim excessive portions of these range blocks when deposited on the ground. If smaller or less dominant animals approach, the dominant bison will gore its rival often resulting in serious injury or death. The dominant bison will then eat an excessive share (in the view of the rancher); and may be on a growth curve plateau, a dominant bull, or a cow out of breeding and lactation.

Another problem presented with raising bison and similar inherently wild animals involves administering medication. Administering the correct amount of medication to herd animals is particularly difficult. Wild animals retreat from humans, and thus a primary practical alternative to capture and injection is administration of the medication orally with feed. However, dominant animals will often consume the feed of weaker or submissive animals, thus compounding the problem of reduced feed.

Similarly, flies present a real problem for bison as well as other range animals. The concentration of manure on limited range land may result in fly infestations which spread disease or unacceptably harass the bison. While domestic animals may be caught and sprayed manually, or ear tags or fly masks may be worn by domesticated animals, these are impractical solutions to a continuous problem requiring periodic handling in the case of wild animals. It is difficult or impossible for human handlers to approach the bison and administer an effective fly spray. Thus, there has developed a need for an apparatus and method for effectively administering a fly spray to bison and like wild animals in confinement.

While domestic cattle may placidly share hay or feed supplements, bison are inherently different animals. Accordingly, there has developed a real need for an alternative to conventional range feeding for bison which will reduce the likelihood of injury to bison in the herd, provide a rationed feed according to the desires of the rancher, and prevent "poaching" of feed intended for smaller bison by larger or more dominant animals. In addition, there is a particular need for a feeder which can be used as a standalone unit in remote environments.

SUMMARY OF THE INVENTION

These and other needs have largely been met by the bison feeder in accordance with the present invention. That is to say, the bison feeder hereof is particularly adapted to minimize injury to bison on the range, permit individualized rationing for the bison in the herd, administer feed supplements and medication with the feed, apply a fly spray to the bison during feeding, and limit the amount of feed to any one animal according to the desires of the rancher. The bison feeder hereof may be provided as a separate unit housed in a building or as a feeder towed to a location on the range selected by the rancher. Further, it is within the scope and contemplation of this invention that the bison feeder be self-powered once in place by a generator, such as a propane, gasoline or wind generator, or solar power, and may be controlled by radio telemetry to permit true isolated operation.

Broadly speaking, the bison feeder hereof includes a feed storage unit, a feed dispensing unit, and a controller unit for identifying bison and actuating the dispensing unit to deliver a desired ration of grain. A wheeled carriage is preferably provided for carrying the remaining components and for towing to the herd to be fed. The carriage further preferably includes a plurality of extensible separating legs which serves to isolate the feeding bison from others in the herd and provide additional stability. A key benefit to the bison feeder of the preferred embodiment is the inclusion of screens or plates to obscure or limit the view of the bison during feeding which limits the normal quarrelsome nature of the animal.

The feeder preferably includes an antenna as a part of the controller unit which generates a signal to activate a transponder worn by the bison. The signal emitted by the transponder is read by this antenna, which is preferably swingably mounted for adjusting the distance between the antenna and the transponder according to the size of the animal. For instance, the antenna is positioned for reading the transponder of a small bison calf, but can swing to accommodate the much larger head of a mature bull. The antenna is also preferably located to obscure the view of other feeding bison. The antenna is supported by an arm which is ruggedly constructed to resist damage due to violent action by the bison.

Advantageously, the feed dispensing unit is coupled to the controller so that only a small portion of the allotted feed is dispensed at one time. Thus, if the transponder carried, e.g., in an ear tag or around the neck of a smaller animal is read, only a small portion of that animal's total ration may be lost if a dominant animal moves in to "steal" its food. By dispensing food corresponding to the bison identified by the transponder tag only while that identified bison is at a feeding site or station, only a small portion of the total ration is dispensed at one time, with subsequent allotments delivered by the feed dispensing unit until the total allotment is provided. In this way, each bison is more likely to receive the correct ration. The central processing unit of the controller includes a memory which retains the information about the amount of the allotted ration which has been delivered, so that if a bison moves away from the feeding site or station before the total ration is delivered, it may return to receive the balance of its ration.

In particularly preferred forms of the invention, medication may be supplied to the bison with the feed. The medication may be supplied from a separate feed bin, so that the particular animal and the amount of medication dispensed may be individualized. Because ideally the medication or feed supplement is administered with the feed, the bison receives and readily ingests the desired dosage of medication or feed supplement which may be particularized for each animal in the herd.

Furthermore, particularly preferred forms of the invention include an insecticide administration system which permits bison to be sprayed with an insecticide during feeding. Most preferably, the spray is administered to each animal on a desired frequency, such as daily, during the initial feeding of the animal for each cycle. The insecticide administration system is coupled to the interrogator for operating the feed dispensing unit so that each animal is identified and sprayed accordingly during initial feeding. By spraying the bison during feeding, not only is location established for targeting the spray, but also the bison is less likely to startle and bolt as a result of the spraying. Preferably, the fly spray employed is non-toxic if ingested internally by the bison, so that if some of the spray drifts into the feed bowl, the bison is unharmed.

These and other objects of the present invention may be better appreciated with reference to the drawings and their description as set forth below.

DESCRIPTION OF THE PREFERRED EMBODIMENT

Figure 1:
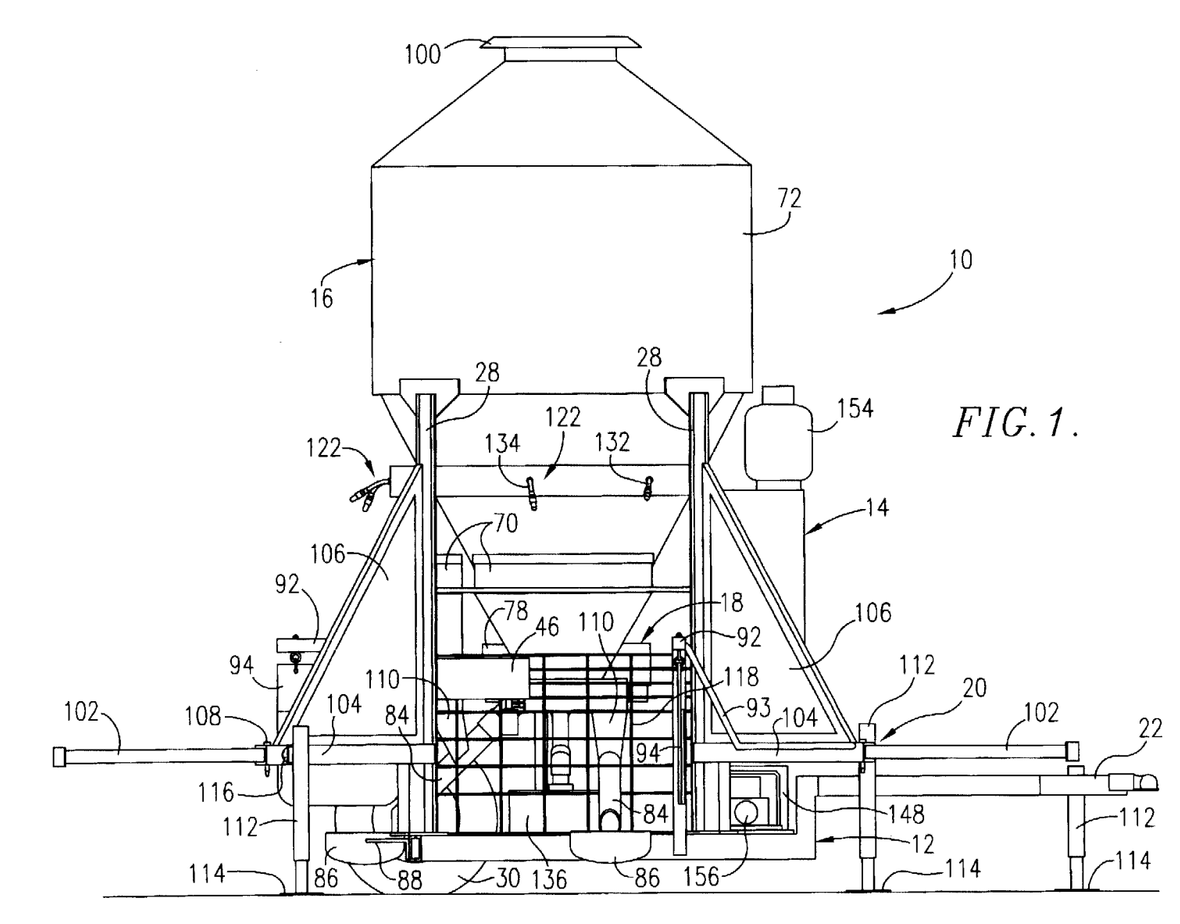
FIG. 1 is a left side elevational view of the bison feeder in accordance with the present invention with the left wheel omitted, showing the separation legs in an extended position with the towing bar extending forwardly.
Figure 2:
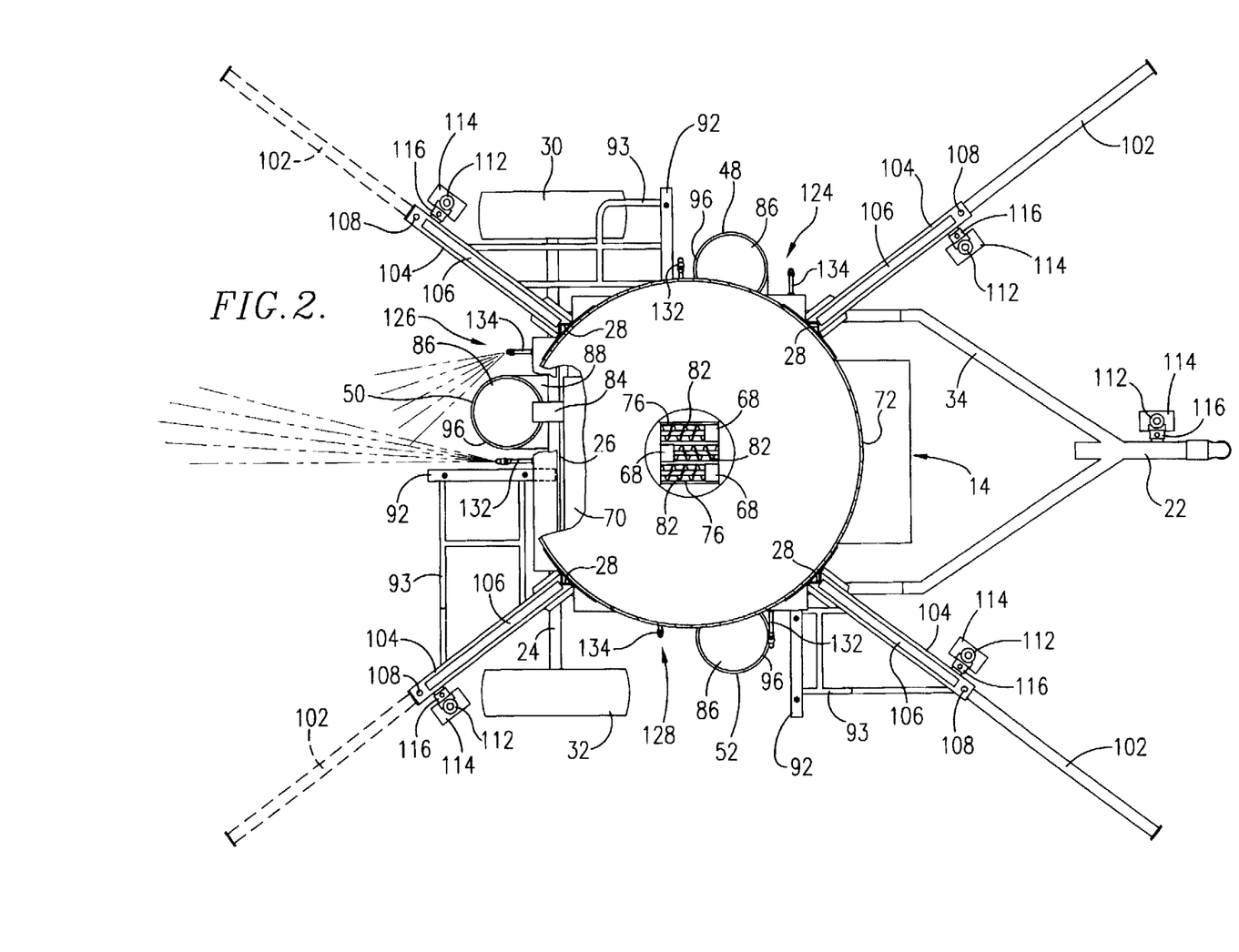
FIG. 2 is a horizontal sectional view of the bison feeder hereof taken through the feed storage unit, showing the rear separation legs in a retracted position with their extended position shown in phantom and the fly spray pattern toward the head and body depicted at the rear feed station.

Referring now to the drawings, a bison feeder 10 in accordance with the preferred embodiment of the present invention is illustrated in FIGS. 1 and 2 and includes a frame 12, a controller unit 14, a feed storage unit 16, a feed dispensing unit 18, and a plurality of animal separators 20 which serve to both stabilize the bison feeder 10 once positioned and to limit movement of bison between feeding stations. The frame 12 also includes a tow bar 22 which facilitates portability in moving the bison feeder 10 to a different location.

In greater detail, the frame 12 is shown generally in FIGS. 1 and 2 and includes a carriage 26 with an axle 24, the axle 24 being positioned at the rear of the bison feeder 10 and which is rotatably mounted to the frame 12. The frame is generally welded together of steel box channels into a rectangle which serves to support four uprights 28 preferably of steel, angle iron or other suitable materials and located at the corners thereof. The axle carries a pair of opposed wheels 30 and 32 at the rear of the bison feeder 10, while the tow bar 22 is located at the front of the frame 12. The tow bar includes a yoke 34 which is provided with a conventional trailer hitch.

Figures 6, 7:
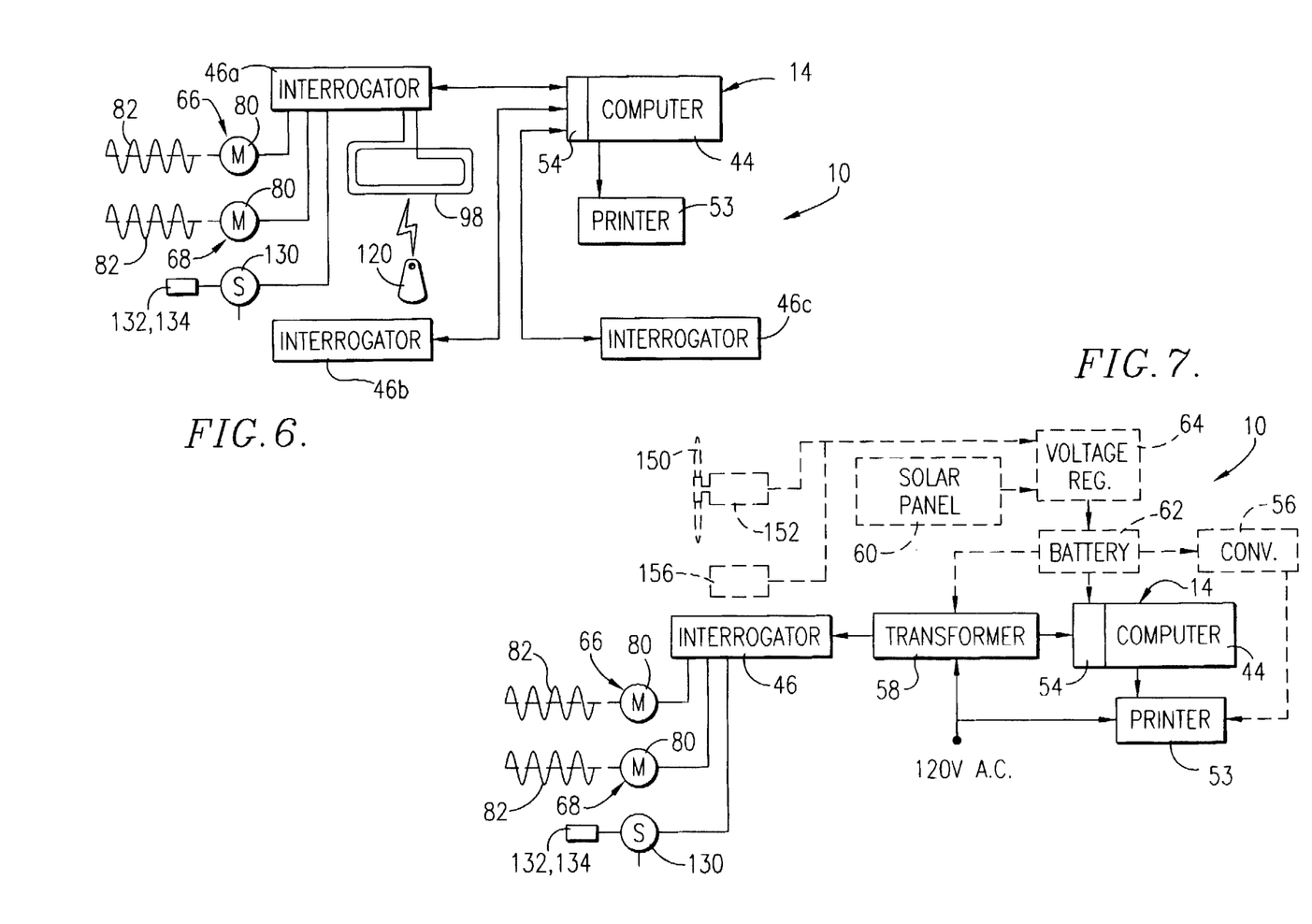
FIG. 6 is a schematic view showing the signal path components of the bison identification, controller and operating components for actuating the medication and feed augers and the fly spray solenoid in response to animal identification signals.
FIG. 7 is a schematic view showing the power supply connections for the identification, controller and operating components, with additional interrogators and the antenna omitted for simplicity, with optional power supply sources illustrated in phantom.

The controller unit 14 includes a central processing unit 44 shown schematically in FIGS. 6 and 7 and an exemplary unit 44 suitable for use in the present invention is a VC4-250 unit manufactured by Nedap Poiesz of Hengelo (GLD), The Netherlands and provided with programmable read only memory (PROM) chip Part Number 2802015 Version CPS3FSS from the same source. FIG. 6 illustrates the signal path for operative connection of the feeder 10, wherein the central processing unit 44 is coupled to a plurality of interrogators 46 through a connection box 54 provided by Nedap of Holland as Part Number 9803114. The number of interrogators 46 used corresponds to the number of feeding sites in the bison feeder 10. For example, in the present invention, three feed stations 48, 50 and 52 defining respective feed sites are provided and thus the central processing unit 44 is coupled to three corresponding interrogators 46A, 46B and 46C. An exemplary interrogator for use herein is supplied by Nedap Poiesz of Hengelo (GLD), Holland as Part No. 9833153. The central processing unit 44 is also connected to a printer 53, such as an Epson LQ5704 via conventional serial cable.

Current is supplied to power the operation of the feeder as illustrated schematically in FIG. 7. Outside current, supplied at 120 volts A.C. is provided by conventional utility supply or a remote generator. The current is supplied to the central processing unit 44 through the connection box 54 which, in this instance, converts the current to 24 volts A.C. Current is supplied to the interrogators 46 through a current monitoring bridge 56, such as Model 9650580 from Nedap which is in turn incorporated in a transformer 58 such as Model 9809635 from Nedap to step down the current to 24 volt D.C. and 24 volt A.C. The interrogators 46 in turn power the auger drive motors 80 for the medication dispensing auger 66 and the feed dispensing auger 68, as explained in greater detail below. Current to operate the bison feeder 10 may be supplied by conventional 110 volt AC power provided from utility circuits, or in remote operations may be provided by an on-site generator powered by, e.g., propane tanks. Further, as shown in phantom schematically in FIG. 7, it is within the contemplation of this invention that power could also be supplied by roof-mounted solar panels 60 which would be located away from access by the feeding bison. The solar panels 60 would in turn be connected to a battery 62 via battery supplying 24 volt D.C. battery supplying 24 volt D.C. current to the central processing unit 44 through a plug adaptor to convert the voltage to 24 volt A.C., to the transformer 58 including the bridge 56 therein for delivery to the interrogators 46 and auger drive motors 80, and to the remaining components such as a printer via a converter 57 to change the 24 volt D.C. to 120 volt A.C. as necessary. For small herds and economical operation, power could be supplied only by batteries, which would be charged or changed periodically as necessary. As shown in FIG. 7, an impeller 150 may be connected to a generator or alternator 152 to provide power from wind for units located on the open range, or a generator or alternator 152 may be a powered by propane supplied from tank 154 or other petroleum fuel source such as gasoline or diesel. For example, a Winco Model LLC-4500E propane generator 156 may be coupled to a Garretson Model 650-262 voltage converter with a DC powered solenoid and 12 volt battery used to start the generator when available amperage is below 23 amps arid to stop the generator when available amperage is above 28 amps, with a Magnetech charger used to maintain battery power. Other sources of power may also be provided in appropriate locations.

Figure 3:
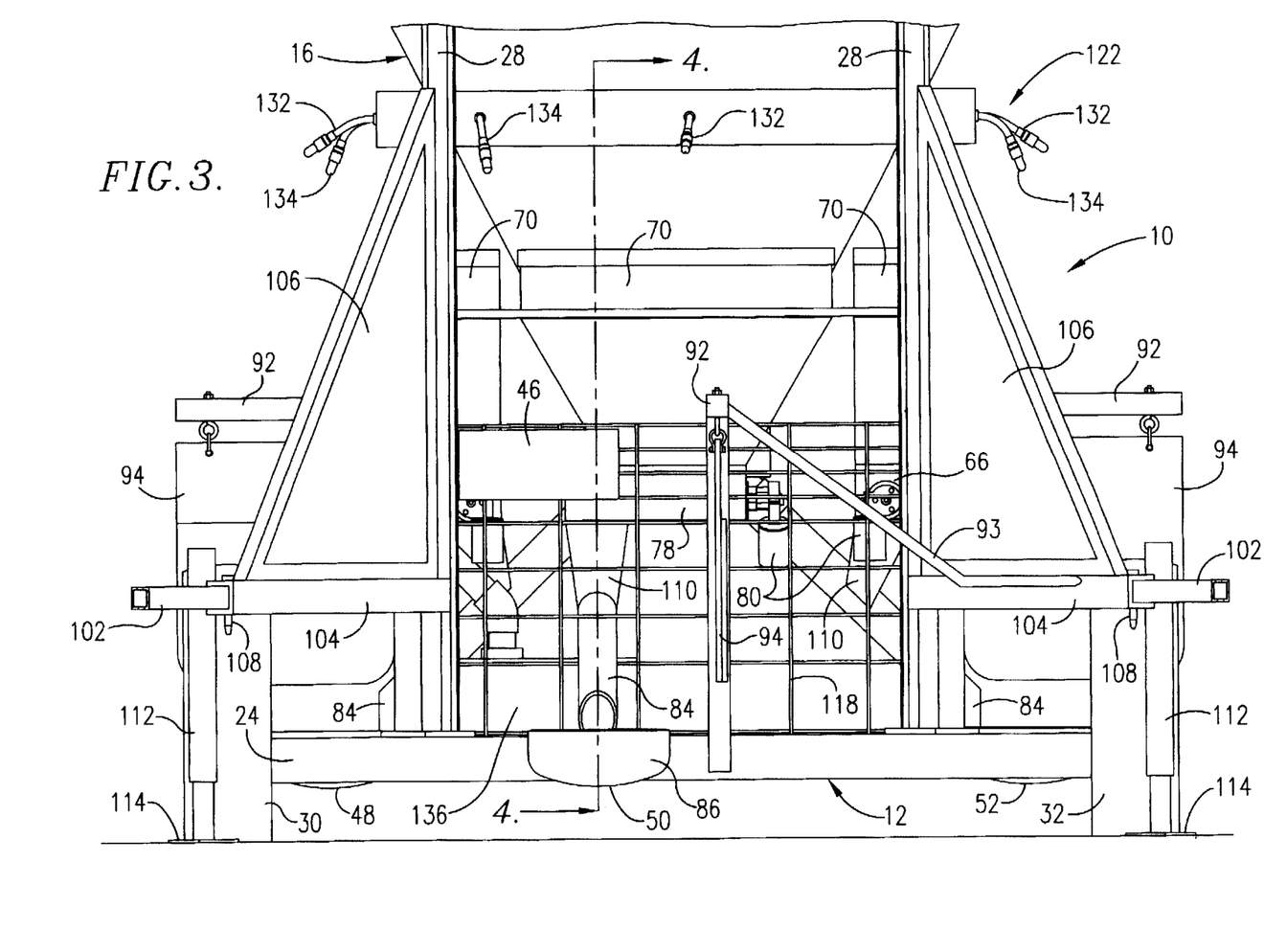
FIG. 3 is an enlarged fragmentary rear elevational view in partial section through the rear legs showing the swingably mounted transponder reader antenna and the feed dispensing conduits and feed cups.
Figure 4:
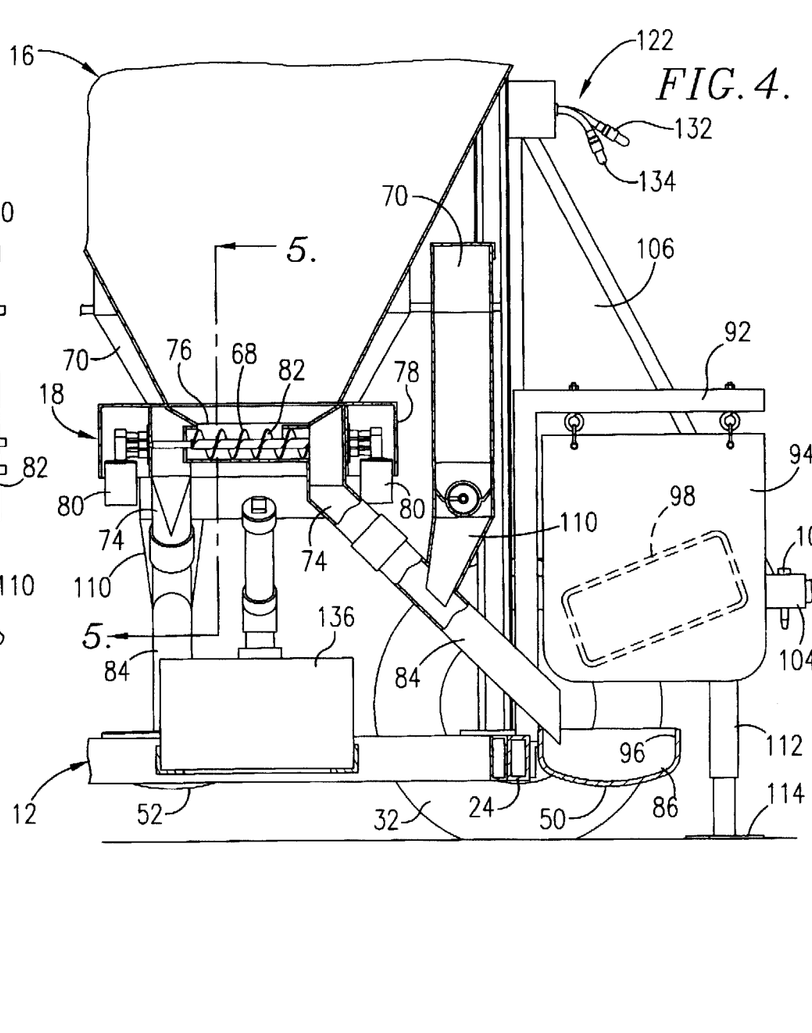
FIG. 4 is an enlarged fragmentary vertical cross-sectional view taken on line 4—4 of FIG. 3 showing the reservoir and the rear medication hopper, chute and feed auger box for delivering medication and feed to the conduits and feed cups.
Figure 5:
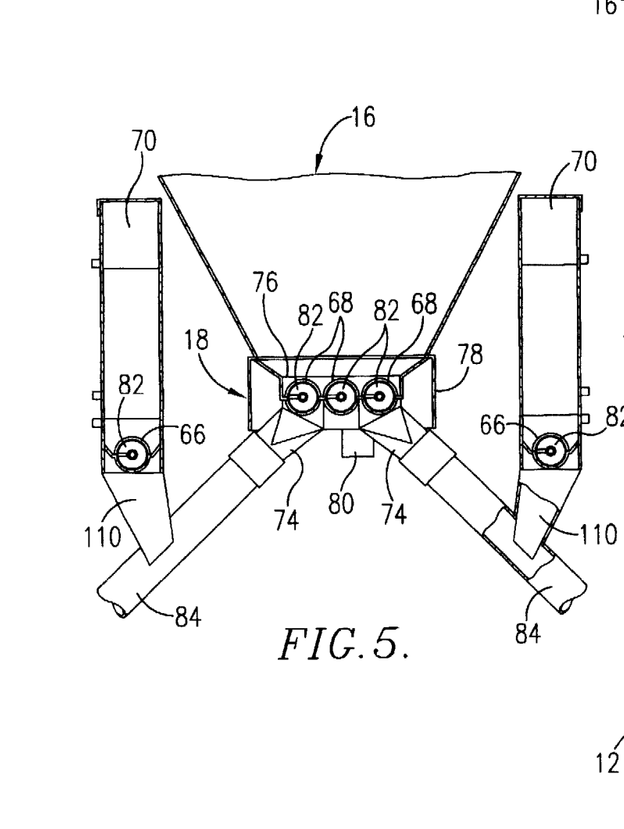
FIG. 5 is an enlarged fragmentary vertical cross-sectional view taken on line 5—5 of FIG. 4 showing the side medication hoppers, downspouts, chutes and the feed augers disposed beneath the main feed hopper.

Each interrogator 46 is in turn coupled to a feed dispensing unit 18 having separate feed delivery augers for each feed station 48, 50 and 52, with only one such connection being shown in FIG. 6 and only one interrogator 46 shown in FIG. 6 for brevity, it being understood that each interrogator 46 is coupled to an antenna, and the auger motor of the feed station. Each feed station includes a medication dispensing auger 66 and a feed dispensing auger 68. Auger units found suitable for use as both medication dispensing auger 66 and feed dispensing auger 68 in the present invention include a three-inch dispensing auger provided by Nedap as Model No. 9837043. As shown in FIGS. 4 and 5, each medication dispensing auger 66 is separately coupled to a respective medication hopper 70 which is relatively much smaller than the main feed hopper 72 best shown in FIGS. 1 and 3. The medication provided in the medication hopper 70 might include vitamins and minerals, antibiotics, or worming medication well known to veterinarians and those in the bison industry. The medication hopper 70 for each feed station is oriented for gravity feed into its respective medication dispensing auger 66 which, when activated, advances a portion of the medication into a feed chute 74 as illustrated in FIG. 6. Similarly, the main feed hopper 72 is provided for gravity feed through feed opening 76 to the respective feed dispensing auger 68 corresponding to each feed station housed in auger feed box 78. The main feed hopper 72 utilizes gravity to distribute feed received within the hopper 72 through the feed opening 76 to each feed dispensing auger 68.

Each feed dispensing auger 68 and medication dispensing auger 66 includes an auger drive motor 80 and an auger screw 82 connected for rotation with the motor 80. Upon receipt of a signal through the interrogator, the drive motor 80 rotates the auger screw 82 of the feed dispensing auger 68 one turn to dispense a desired portion of the ration into the feed chute 74. The feed chute 74 is in turn connected to a conduit 84 which may be of synthetic resin or the like and delivers the portion into the feed cup 86. Similarly, the medication dispensing augers 68 deliver medication to the conduit 84 through downspouts 110. The feed cups are connected to the frame as shown in FIG. 4 by brackets 88.

The frame 12 also carries antenna supports 92 corresponding to each feed station. Each L-shaped antenna support 92 is preferably of tubular steel and welded to the lower portion of the frame as shown in FIG. 4 and includes reinforcing bars 93 to inhibit damage to the antenna support 92 caused by the violent activities of the bison. The antenna supports 92 swingably support panels 94 by chain links, thereby permitting the panels 94 to depend in a vertical position due to gravity but to swing freely away from their position generally adjacent each feed cup 86 uninhibited by the reinforcing bars 93. The antenna panels 94 are thus permitted to swing through a displacement corresponding to the size of the head of the bison at the respective feed station. As may be seen in FIG. 2, each panel 94 is positioned near the upright rim 96 of each feed cup 86 for positioning proximate the transponder ear tag 120 worn by even the smallest bison calf, and is of sufficient size to substantially obscure the peripheral vision to one side of a feeding bison. Each panel 94 incorporates an antenna 98 which is oriented on its respective panel 94 to be positioned adjacent the ear tag of the feeding bison. Exemplary antennas 98 useful with the present invention include Nedap antennas Part No. 7600488 which are typically supplied with the Nedap interrogator identified above but which are preferably separated for use in the bison feeder hereof, the antennas being of sufficient size and durability to withstand contact with the bison when mounted on or incorporated in the swingable panels 94. It is understood that all of the bison in the herd would wear their tag on the same ear, in this instance the right ear, to ensure the antenna is sufficiently proximate the tag to interrogate the ear tag and receive the signal emitted thereby. Such methods of interrogation are generally described in U.S. Pat. No. 4,798,175 to Townsend et al., the disclosure of which is incorporated herein by reference.

The feed storage unit 16 includes the medication hoppers 70 for each feed station and the main feed hopper 72 which is common to each of the feed stations. The main feed hopper 72 receives the feed into auger feed box 78 which houses the feed dispensing augers 68 which are located in substantially parallel alignment. The auger feed box 78 is located at the bottom of the main feed hopper 72 for gravity feed as illustrated in FIG. 2. The main feed hopper includes an upper unit which is generally circular in cross-section and is provided with a removable roof section 100 which may be accessed by a ladder coupled to the uprights 28 and removed or repositioned by lines attached thereto. The roof section 100 may be removed to provide access for recharging the main feed hopper with the desired feed. The main feed hopper 72 is secured by bolts or other fasteners to the uprights 28.

The animal separators 20 include a plurality of shiftably mounted legs 102 which may be carried in a generally inboard position underneath the main feed hopper 72 during travel and held by pins 108 or the like inserted through receivers 104 fixed relative to the frame 12. Each of the receivers 104 carries a strut 112. The strut may be shifted vertically from an upper transport position to a lower stabilizing position, each strut 112 resting on a baseplate 114. Pins extending through holes in both the strut 112 and a collar 116 hold the strut in either the desired transport or stabilizing position. The legs 102 are preferably at least six feet or more in length to provide good separation between the bison at each feeding station and inhibit their ability to fight during feeding. Because of the combative nature of the animal, a wire mesh fence 118 extends between the uprights to protect the feed chutes and dispensing augers from injury due to curious or combative bison. A vision-impairing plate 106 is of a triangular configuration and extends between the uprights 28 and the receivers 104 to obscure the vision of bison feeding at adjacent feed stations 48, 50 and 52. In addition, a ladder may be provided along one side of the main feed hopper to facilitate access to tile roof section 100. Finally, the side of the main feed hopper may be provided with a plurality of openings and covered with transparent material such as glass or resin to determine the level of feed in the main feed hopper 72.

In the preferred embodiment of the bison feeder 10 hereof, an insecticide administration system 122 is provided for spraying the bison with an insecticide during feeding. The insecticide system 122 includes spray stations 124, 126 and 128 corresponding to respective feed stations 48, 50 and 52. Each spray station 124, 126 and 128 includes a solenoid unit 130, fluidically coupled to spray nozzles 132 and 134. An exemplary solenoid unit 130 may include a Dayton relay Model No. 1A487F 24 volt DC mounted on an H-pin No. 5x853F square type socket and connected to Dayton solenoid coil Model 3A439 24 volt DC in a Dayton solenoid valve body Model No. 1A576. It may be appreciated that nozzles 132, being positioned closest to the panels 94, direct a spray pattern toward the hind end or body portion of the animal, while the nozzles 134 are opposite the panels 94 and direct a spray pattern toward the feeding bisons head, all as shown in FIG. 2. Each solenoid unit 130 is connected to a respective output on an interrogator 46. Interrogator 46A is illustrative, showing augers 66 and 68 and solenoid unit 130 for one 'spray station 124/feed station 48 electrically coupled to respective outlets of the interrogator. Each solenoid unit acts as control valve to selectively permit the flow of liquid spray to the respective nozzles responsive to signals received from the interrogator.

Figure 8:
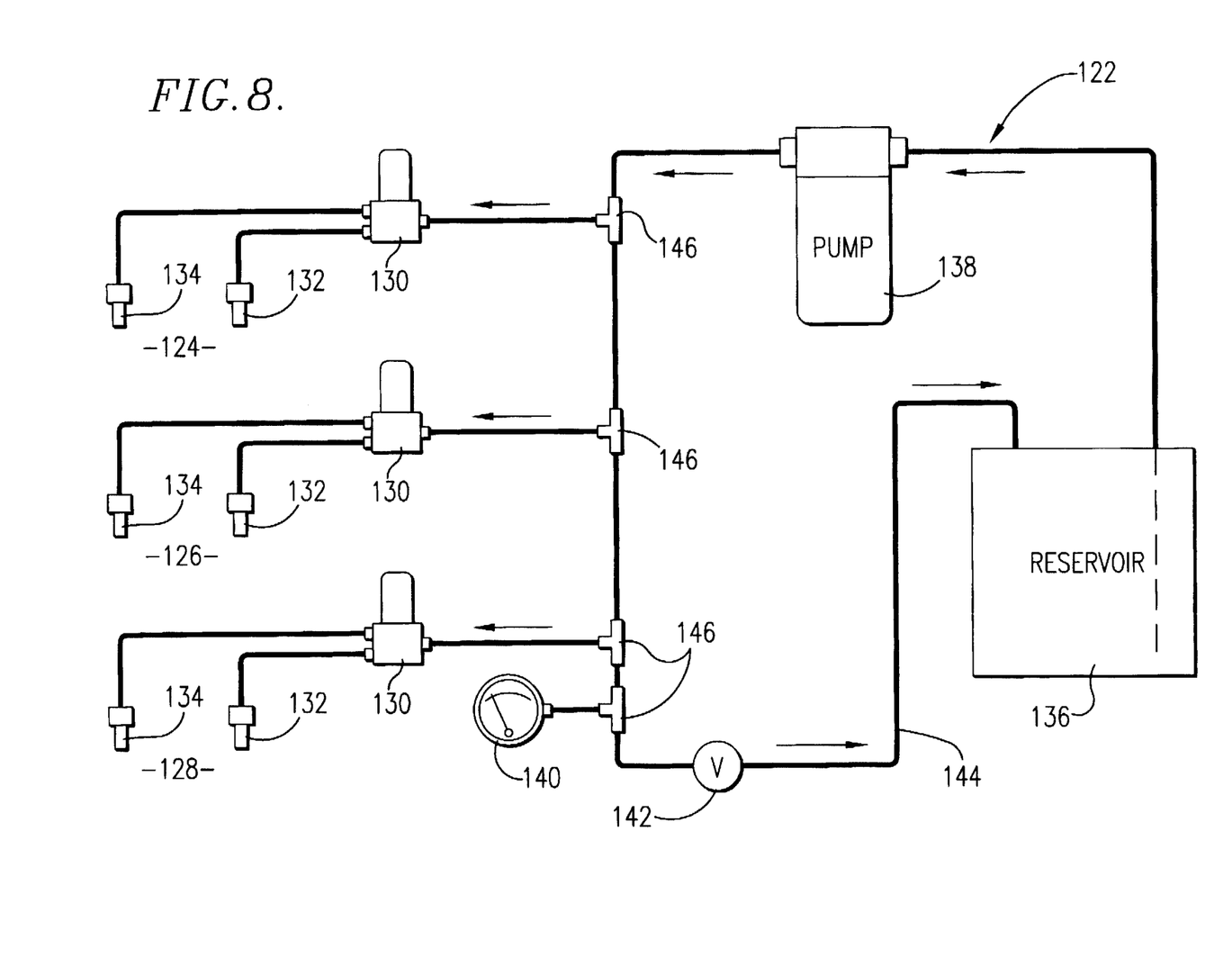
FIG. 8 is a schematic view of the hydraulic circuit of the insecticide administration system.

FIG. 8 illustrates the hydraulic circuit of the insecticide system 122 which includes reservoir 136, pump 138, pressure gauge 140 and mixing valve 142. The reservoir 136, pump 138, pressure gauge 140 and mixing valve 142 are connected in a loop of conduit 144, such as vinyl tubing, to maintain pressure within the system 122 and to ensure mixing of the contents of the reservoir 136. When the system 122 is sufficiently pressurized, the mixing valve 142 opens to permit bypass of the insecticide back to the reservoir 136 to mix the contents thereof. T-connections 146 connect the spray stations 124, 126 and 128 to the conduit 144 whereby insecticide is delivered on demand to the solenoids 130. A 9 gallon recreational vehicle water reservoir has been found sufficient for most uses in storing the insecticide. One pump 138 useful in the present invention is a Shurflo Model No. 2088-403-444 12 volt DC receiving current from the battery or from the generator or 110 volt AC current passing through a voltage converter. The pump 138 pressurizes the system 122 to a suitable pressure, such as 45 psi. An enclosure 148 located adjacent the controller unit 14 contains the reservoir pump 138, pressure gauge 140 and mixing valve 142.

During use, the main feed hopper 72 and each of the medication hoppers 70 are filled with bison feed and any medication to be administered orally such as for worming or the like. With power supplied via conventional utility current, a remote power generator, or solar-generated electrical power, the central processing unit is then programmed for each bison in the herd. For example, certain bison may be substantially mature and require only a maintenance ration. Other bison, such as lactating cows or young bison experiencing rapid growth, may require additional feed and nutritional supplements. After appropriate transponder ear tags 120, such as Part No. 9821554 by Nedap, have been placed on each of the bison's right ears, the bison feeder is ready for operation.

By predepositing a portion of feed into each feed cup 86, bison can be conditioned to approach the feeder 10 for feeding. As the bison's head comes down into a feeding position at the feeding site, reflected by the feed cup 86 hereof, the interrogator 46 initiates a magnetic pulse through the antenna 98 which causes the ear tag 120 of the animal to generate a corresponding signal unique to that ear tag 120/bison. Because of the positioning of the feed cup 86, the bison's head is positioned so that the transponder ear tag 120 is located proximate the antenna. The identifying signal is received by the antenna and communicated through the interrogator to the central processing unit 44. The bison is identified by the central processing unit, which in turn signals the medication dispensing auger 66 and feed dispensing auger 68 to rotate their auger screws 82 one turn. This dispenses approximately ¼ pound of feed or medication through the feed chute 74 and the conduit 84 to the feed cup 86. It is contemplated that only a small portion of medication would be distributed relative to the feed from the main feed hopper 72. Thus, only a portion of the desired ration would be delivered during the initial interrogation. On second and subsequent interrogations, preferably occurring at about 20-second intervals, the feed dispensing auger 68 and, if necessary, the medication dispensing auger 66 would rotate their auger screws an additional turn to dispense additional feed or medication, all provided that the bison's ear tag remains sufficiently proximate the antenna to generate a responsive signal.

This process would continue at 20-second intervals until the successive portions delivered equal the entire preprogrammed ration for that particular bison, as programmed into the central processing unit 44, is delivered. Thereafter, the bison corresponding to that particular identification tag 120 would receive no additional feed for that feeding period, notwithstanding a return to the bison feeder 10 during that feeding period. For example, if a large dominant bison consumed its total ration, it could not return later for a second total ration until the next feeding period, for example one day. Even if that dominant bison were to chase away a less dominant bison, it could only "steal" a small portion of that less dominant animal's feed from the feed cup 86. When the less dominant animal returned, it would be identified by its ear tag and the remainder of its total ration would be delivered in small portions until it had received its entire ration. If the feeding period is daily, the internal clock of the central processing unit would indicate when the previous period had expired and on the next day, each bison would be able to receive its next daily ration.

The controller unit 14 also includes a printer. The printer receives reports from the central processing unit 44 which enables the printer to provide a report of the status of each bison in the herd. This is particularly advantageous for range animals as a sick or missing bison can be identified by its absence from the feeding report.

The legs 102 assist in separating the bison during feeding. Instead of the bison observing other animals in the herd during feeding at the bison feeder 10, the plates 106 obstruct the bison's vision and limit agitation of the animals due to competition during feeding. Moreover, the extended legs serve to separate the bison from one another, so that only one bison is generally found at a respective feed station 48, 50 and 52. On the other hand, the legs are positioned at broad open angles so that the bison do not feel confined during feeding and resist approaching the bison feeder 10. Once the bison feeder has exhausted its supply of feed in the main feed hopper 72, the legs may be shifted to the transport position and the tow bar 22 positioned on an automotive vehicle so that the bison feeder 10 may be towed to a feed bin for recharging or maintenance.

An insecticide or insect repellant, and more particularly any conventional livestock fly spray may be applied to the animals during feeding at the feed stations 48, 50 and 52 corresponding to the respective spraying stations 124, 126 and 128. For example, one of the many acceptable sprays known to livestock ranchers is sold under the trademark ECTIBAN, which may be sprayed in the vicinity of the animal's feed without substantial risk of toxicity to the animal. Preferably, a spray duration of about four seconds has been sufficient to provide adequate coverage. The spray is preferably applied during the initial feeding during each cycle, such as a 24 hour period as programmed into the interrogator. As each bison is initially identified for the feeding cycle period, such as the first feeding of the day, as the signal from the transponder in the ear tag 120 is recognized by the antenna 98, the interrogator signals the solenoid 130 at the respective spray station to permit the flow of insecticide to the spray nozzles. After the programmed duration of the spray is completed, the solenoid 130 closes and no further spray is administered for the cycle. It is to be understood that the rancher may desire multiple sprayings during the time cycle and that the insecticide administration system may readily be adapted to this end by one skilled in the art. The bison may then continue to feed until its ration is consumed. By administering the spray during feeding at the feed station, the bison is less likely to be alarmed, and the bison is likely to remain stationary to receive better coverage of the spray.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. An animal feeding apparatus for free access feeding by animals in a herd, said apparatus comprising:

a storage unit for holding a quantity of feed;

a multiplicity of feed dispensers circumferentially arrayed about said storage unit, each of said feed dispensers being in independent operative communication with said storage unit for selectively and independently delivering a portion of said feed to a respective stationary feeding site accessible to each of said animal in the herd;

a respective animal identifying element adapted for attachment to each animal to be fed in the herd;

a multiplicity of antennae, and mounting means positioning each of said antennae proximate to a respective one of said feeding sites for receiving respective animal identifying signals from the identifying elements worn by the animal to be fed when in proximity to one of said antennae;

a controller for identifying animals to be fed and for independently and selectively actuating each of said feed dispensers to deliver a portion of said feed specific to the identified animal; and a panel carrying one of said antennae located proximate to each of said feeding sites, each of said panels being configured in vertically oriented for obstructing the view of the animal at one feeding station of other animals in the herd.

2. Apparatus as set forth in claim 1, wherein said feeding site includes a feed receiver coupled to said feed dispenser for receiving said portion of feed and configured for permitting an animal to feed therefrom.

3. An animal feeding apparatus as set forth in claim 1, wherein said controller is operatively connected to each of said feed dispensers for simultaneously delivering a portion of feed specific to different animals in the herd located at respective feeding sites and for successively delivering portions of one animal's total periodic ration by any of said feed dispensers.

4. Apparatus as set forth in claim 1, wherein said second dispenser is operatively coupled to said controller for dispensing said material concurrently with said portion of feed.

5. An animal feeder as set forth in claim 1, wherein said apparatus includes a carriage having a plurality of wheels rotatably mounted thereon for movably carrying said storage unit of feed dispensers, controller, and antennae.

6. Apparatus as set forth in claim 5, including a frame mounting means extending outwardly from said storage unit for inhibiting movement of animals between adjacent feeding sites.

7. Apparatus as set forth in claim 6, including at least one barrier mounted on said inhibiting means for restricting vision of feeding animals at adjacent feeding sites.

8. Apparatus as set forth in claim 6, wherein said inhibiting means are pivotally mounted on said frame for shifting between a retracted position proximate said storage unit and an extended position for inhibiting movement of animals between adjacent feeding sites.

9. Apparatus as set forth in claim 1, wherein said controller is programmable for dispensing a preselected ration of animal feed corresponding to identified individual animals in multiple successive intermittently delivered portions.

10. Apparatus as set forth in claim 9, wherein said controller is operatively coupled to said feed dispenser whereby said intermittently delivered portions are delivered by said feed dispenser only in response to signals received by said antenna corresponding to said identified individual animals.

11. Apparatus as set forth in claim 9, wherein said multiple successive intermittently delivered portions are dispensed at preselected intervals.

12. Apparatus as set forth in claim 9, wherein said controller is operatively coupled to said feed dispenser for identifying and delivering a selected quantity of feed to an identified animal during each of a plurality of successive feeding cycle periods.

13. Apparatus as set forth in claim 1, including means for applying a liquid spray to the animal.

14. Apparatus as set forth in claim 13, wherein said spray is an insecticide.

15. Apparatus as set forth in claim 13, wherein said spray applying means is operatively coupled to said controller for administering said spray responsive to the presence of an animal at the feeding site.

16. Apparatus as set forth in claim 15, wherein said spray applying means is operatively coupled to said antenna for applying spray in response to signals received by said antenna corresponding to the identified individual animal.

17. An apparatus as set forth in claim 1, including power supply means carried by the apparatus.

18. An apparatus as set forth in claim 17, wherein said power supply means includes a solar panel.

19. An apparatus as set forth in claim 17, wherein said power supply means includes a wind powered generator.

20. An apparatus as set forth in claim 17, wherein said power supply means includes a petroleum fueled generator.

21. An apparatus as set forth in claim 1, including means for applying a liquid spray to the animal.

22. Apparatus as set forth in claim 21, wherein said spray is an insecticide.

23. Apparatus as set forth in claim 21, wherein said spray applying means is operatively coupled to said controller for administering said spray responsive to the presence of an animal at the feeding site.

24. Apparatus as set forth in claim 21, wherein said spray applying means is operatively coupled to said antenna for applying spray in response to signals received by said antenna corresponding to the identified individual animal.

25. Apparatus as set forth in claim 1, including means shiftably mounting said panel proximate the head of the animal during spraying at said spraying site for yielding responsive to engagement by the animal's head.

26. An animal feeding apparatus for feeding and spraying animals in a herd comprising:

a storage unit for holding feed for said herd of animals;

feed delivery means for receiving feed from said storage unit and delivering a portion of feed to a feeding site accessible to each of said animals in the herd;

an individual animal-identifying element adapted for attachment to each animal of the herd in order to generate a unique identifying signal for each animal respectively;

an antenna located proximate said feeding site for receiving an identifying signal when the corresponding element-bearing animal is located proximate thereto;

spray-delivery means for selectively applying a liquid spray to animals at the feeding site; and a controller including memory means for storing therein the feeding and spray regimen of animals in the herd for a respective predetermined time period, said controller being operatively connected to said feed delivery means, said antenna, and said spray-delivery means for selectively administering a dose of spray and for preventing overdosing of the identified animal with said liquid spray during said predetermined time period in response to said identifying signal, and for feeding a portion of a total periodic ration prescribed by said regimen for the identified animal in response to said identifying signal.

27. An animal feeder as set forth in claim 26, wherein said apparatus includes a carriage having a plurality of wheels rotatably mounted thereon for movably carrying said storage unit of feed dispensers, controller, and antennae.

28. An apparatus as set forth in claim 26, including power supply means carried by the apparatus.

29. An apparatus as set forth in claim 28, wherein said power supply means includes a solar panel.

30. An apparatus as set forth in claim 28, wherein said power supply means includes a wind powered generator.

31. An apparatus as set forth in claim 28, wherein said power supply means includes a petroleum fuel generator.

32. Apparatus as set forth in claim 26, including a plurality of spray nozzles for spraying a plurality of different animals at different feeding sites, each spraying site having at least one spray nozzle.

33. Apparatus as set forth in claim 32, wherein said spray application system includes at least one valving mechanism corresponding to each spray site fluidically coupled between said at least one spray nozzle and said reservoir and operatively coupled to said controller.

34. Apparatus as set forth in claim 33 wherein said valving mechanism includes a solenoid.

35. A method for feeding bison in a herd comprising the steps of:

attaching one of a multiplicity of transponder tags to each bison in the herd to be fed at a feeding station, each of said tags adapted for providing a bison-identifying signal;

providing a bison feeding station, said bison feeding station including a feed storage unit containing a quantity of feed, a feed dispenser for delivering feed to a feeding station which remains stationary during feeding of the herd, an antenna located proximate to the stationary feeding location for receiving bison identifying signals, and a controller having a memory storing an individualized periodic feeding ration particularized for each bison to be fed;

permitting access to the bison feeding station by all bison in the herd;

identifying each bison provided with one of the tags when the bison moves into a position proximate the antenna; and dispensing a portion of said individualized ration for a particular bison to the feeding station in response to identification of the bison.

36. A method of feeding bison as set forth in claim 35, including the steps of providing a medication storage unit and a medication dispensing unit for delivering a quantity of medication to the bison at said feeding station, storing individualized periodic medication dosage information particularized for each bison to be medicated in the herd in said memory, and dispensing a portion of the dosage of the medication corresponding to the identified bison at said feeding station concurrently with delivery of the portion of the feed.

37. A method as set forth in claim 35, including the steps of providing a liquid spray apparatus, storing spray application information particularized for each bison to be sprayed in the herd in said memory, and applying a quantity of the liquid spray corresponding to the identified bison at said feeding station concurrently with the delivery of the portion of the feed.

38. A method as set forth in claim 35, wherein said spray is an insecticide.

39. A method as set forth in claim 35, wherein the spray is applied for a preselected duration less than the duration of a preselected feeding cycle.

40. A method as set forth in claim 35, including simultaneously feeding and medicating a plurality of animals at a plurality of feeding sites, said feed being delivered from a common feed storage unit.

41. A method as set forth in claim 35, including the step of preselect the duration of a feeding cycle and delivering the selected quantity of medication during each of a plurality of successive feeding cycles.

42. A method as set forth in claim 35, including applying a liquid spray to the animal in response to electronically reading the signal.

43. Apparatus for applying a spray to range animals comprising:

spray application system including a reservoir for holding liquid to be sprayed and at least one spray nozzle in fluidic communication with said reservoir for selectively spraying a quantity of said liquid to be sprayed to a spray site;

a controller for identifying animals at the spray site operatively coupled to said spray application system for selectively actuating said feed spray application system to deliver said quantity of liquid to be sprayed corresponding to the identified animal; and     an antenna operatively coupled to said controller for receiving a signal from an identifying element worn by the animal to be sprayed.

* * * * *